United States Patent
Ogawa et al.

(10) Patent No.: US 9,061,357 B2
(45) Date of Patent: Jun. 23, 2015

(54) HIGH PRECISION CHUCK WITH CENTERING FUNCTION

(75) Inventors: Gen Ogawa, Okazaki (JP); Joji Isozumi, Aichi-ken (JP); Osamu Nagai, Nagoya (JP)

(73) Assignee: FUJI MACHINE MFG. CO., LTD., Chiryu-shi (JP)

( * ) Notice: Subject to any disclaimer, the term of this patent is extended or adjusted under 35 U.S.C. 154(b) by 1164 days.

(21) Appl. No.: 12/948,021

(22) Filed: Nov. 17, 2010

(65) Prior Publication Data

US 2011/0115172 A1    May 19, 2011

(30) Foreign Application Priority Data

Nov. 19, 2009   (JP) .................................. 2009-263625

(51) Int. Cl.
*B23B 31/177*   (2006.01)
*B23B 31/28*    (2006.01)
(Continued)

(52) U.S. Cl.
CPC ........... *B23B 31/28* (2013.01); *Y10T 279/1986* (2015.01); *Y10T 279/29* (2015.01); *Y10T 82/2511* (2015.01); *B23B 3/06* (2013.01); *Y10T 279/10* (2015.01); *Y10T 279/19* (2015.01); *Y10T 279/1993* (2015.01); *Y10T 279/21* (2015.01); *Y10T 279/23* (2015.01);
(Continued)

(58) Field of Classification Search
CPC ................. B23B 3/06; B23B 31/16233; B23B 31/16266; B23B 31/28; B23Q 3/152
USPC ........ 279/2.01, 110, 123, 124, 126, 128, 137; 82/122, 142, 167, 169

IPC .......................................... B23B 31/171,31/177
See application file for complete search history.

(56) References Cited

U.S. PATENT DOCUMENTS 932,709   A  *  8/1909   Johnson ........................ 279/110
1,367,014 A  *  2/1921   Brooker ........................ 279/112
(Continued)

FOREIGN PATENT DOCUMENTS

CN          2863320        1/2007
DE         10049070 A1     5/2002
(Continued)

OTHER PUBLICATIONS

Dec. 3, 2013 Office Action issued in Chinese Patent Application No. 201010558046.7 (with translation).
(Continued)

*Primary Examiner* — Eric A Gates
(74) *Attorney, Agent, or Firm* — Oliff PLC

(57) ABSTRACT

A chuck including: (a) a main body; (b) three slot-defining members each constituted by a member independent of the main body and defining therein a guide slot, and detachably attached to the main body; (c) three jaws each including (c-1) a fitted portion slidably fitted in the guide slot defined in the corresponding slot-defining member and (c-2) an engaging portion which projects from the fitted portion in an axial direction and which is configured to engage with a circumferential surface of an object that is to be held by the chuck; and (d) three pairs of pressing members detachably fixed to the three slot-defining members. Each pair of the three pairs of pressing members engage with the fitted portion of the corresponding jaw, for thereby preventing separation of the fitted portion of the corresponding jaw from the guide slot defined in the slot-defining member.

12 Claims, 6 Drawing Sheets

(51) Int. Cl.
  *B23B 3/06* (2006.01)
  *B23Q 3/152* (2006.01)
(52) U.S. Cl.
  CPC .... *B23B 31/16233* (2013.01); *B23B 31/16266* (2013.01); *B23B 2270/38* (2013.01); *B23Q 3/152* (2013.01)

(56) References Cited

U.S. PATENT DOCUMENTS

| | | | | |
|---|---|---|---|---|
| 2,158,058 | A * | 5/1939 | Godfriaux | 279/4.12 |
| 2,543,117 | A * | 2/1951 | Mackmann | 279/136 |
| 2,741,481 | A * | 4/1956 | Ortegren | 279/128 |
| 2,790,938 | A * | 4/1957 | Brandenburg | 335/289 |
| 2,993,701 | A * | 7/1961 | Arnold | 279/114 |
| 3,460,849 | A | 8/1969 | Highberg et al. | |
| 3,700,250 | A * | 10/1972 | Bautz | 279/35 |
| RE29,533 | E * | 2/1978 | Parsons | 279/133 |
| 4,103,915 | A * | 8/1978 | Zdanovsky et al. | 279/119 |
| 4,192,521 | A * | 3/1980 | Smith | 279/112 |
| 4,197,769 | A * | 4/1980 | Smith et al. | 82/129 |
| 4,556,228 | A * | 12/1985 | Ferraro | 279/154 |
| 4,640,518 | A * | 2/1987 | Ferraro | 279/123 |
| 4,645,219 | A * | 2/1987 | Link et al. | 279/130 |
| 4,730,373 | A * | 3/1988 | Senoh | 29/26 A |
| 4,742,739 | A * | 5/1988 | Yamaguchi et al. | 82/122 |
| 4,960,285 | A * | 10/1990 | Doi | 279/123 |
| 5,025,690 | A * | 6/1991 | Myers | 82/121 |
| 5,143,687 | A * | 9/1992 | Howard et al. | 279/123 |
| 5,899,464 | A * | 5/1999 | DeFeo | 279/124 |
| 6,017,266 | A * | 1/2000 | Tabachenko | 451/385 |
| 6,270,084 | B1 | 8/2001 | Tabachenko et al. | |
| 6,491,305 | B2 * | 12/2002 | Sida | 279/124 |
| 6,754,062 | B2 * | 6/2004 | Logan et al. | 361/234 |
| 7,013,543 | B2 * | 3/2006 | Iwabuchi et al. | 29/27 C |
| 7,201,088 | B2 * | 4/2007 | Hammer et al. | 82/122 |
| 7,963,527 | B2 * | 6/2011 | Weller | 279/110 |
| 2002/0014142 | A1 * | 2/2002 | Ward et al. | 82/165 |
| 2008/0012247 | A1 * | 1/2008 | Weller | 279/66 |
| 2009/0096177 | A1 | 4/2009 | Rohm | |

FOREIGN PATENT DOCUMENTS

| | | |
|---|---|---|
| EP | 212205 A1 * | 3/1987 |
| EP | 2 105 226 A1 | 9/2009 |
| GB | 2 176 135 A | 12/1986 |
| JP | U-S52-109679 | 2/1976 |
| JP | U-S61-168927 | 10/1986 |
| JP | U-H04-032806 | 3/1992 |
| JP | U-3005603 | 1/1995 |
| JP | A-2003-127043 | 5/2003 |
| JP | A-2005-230946 | 9/2005 |
| WO | WO 2009/049569 A1 | 4/2009 |
| WO | WO 2013/144233 A1 * | 3/2013 |

OTHER PUBLICATIONS

Jul. 11, 2014 Office Action issued in Chinese Patent Application No. 201010558046.7 (with translation).
Jan. 20, 2015 Office Action issued in Chinese Application No. 201010558046.7.
Sep. 24, 2014 Office Action issued in Japanese Application No. 2013-250866 (with translation).
English Translation of JP-U-H08-8035 Y2.

* cited by examiner

HIGH PRECISION CHUCK WITH CENTERING FUNCTION

CROSS REFERENCE TO RELATED APPLICATION

This application claims priority from Japanese Patent Application No. 2009-263625 filed on Nov. 19, 2009, the disclosure of which is herein incorporated by reference in its entirety.

BACKGROUND OF THE INVENTION

1. Field of the Invention

The present invention relates to improvement in a chuck configured to chuck an object and having a self-centering function.

2. Discussion of Related Art

There is widely used a three-jaw chuck as an universal chuck for coaxially chucking an object such as a workplace that is to be machined. The three-jaw chuck generally includes: a main body; three jaws held on the main body and movable relative to the main body in respective radial directions; and a jaw driving device configured to move the three jaws in synchronization with one another so that the object can be held at its outer circumferential surface or inner circumferential surface by cooperation of the three jaws. On the other hand, there is also known an electromagnetic chuck configured to chuck an object, by causing the object to be sucked onto a holding surface of the chuck by means of a magnetic suction force that is generated by electromagnets. An example of such an electromagnetic chuck is disclosed in JP-2003-127043 A.

SUMMARY OF THE INVENTION

A three-jaw chuck provides, owing to its arrangement in which its three jaws are movable in respective radius directions in synchronization with one another, an advantage that it is possible to easily hold an object coaxially with the chuck, i.e., with a spindle of a machine to which the chuck is attached. In a conventional three-jaw chuck, however, there have been problems that its centering accuracy, holding-position repeatability and durability are not necessarily satisfactory. Further, in an electromagnetic chuck, there have been problems that an object to be chucked has to be necessarily made of a magnetic material because of its arrangement for sucking the object by a magnetic suction force, and also that it takes a long time to center and chuck an object because of the arrangement for sucking an end face of the object, namely, because of absence of self-centering function (i.e., function of making an axis of the object aligned with an axis of the chuck).

The present invention was made in the light of the background as described above, and an object of the invention is to solve at least one of the above problems, for thereby providing a chuck having a higher practicability than a conventional chuck.

The above object may be achieved according to the principle of the present invention, which provides a chuck including: (a) a main body having an central axis (about which the main body is to be rotated); (b) three slot-defining members each constituted by a member independent of the main body and defining therein a guide slot, each of the three slot-defining members having slot-opening-side end surfaces in which the guide slot opens, the three slot-defining members being detachably attached to the main body such that the guide slot of each of the three slot-defining members extends in a radial direction that is perpendicular to the central axis of the main body; (c) three jaws each including (c-1) a fitted portion which is slidably fitted in the guide slot defined in a corresponding one of the three slot-defining members and which has an opening-location surface that is located in the opening of the guide slot of the corresponding one of the three slot-defining members and (c-2) an engaging portion which projects from the fitted portion in an axial direction parallel to the central axis and which is configured to engage with an outer circumferential surface or an inner circumferential surface of an object that is to be chucked by the chuck; (d) three pairs of pressing members detachably fixed to the slot-opening-side and surfaces of the three slot-defining members, each pair of the three pairs of pressing members engaging with the opening-location surface of the fitted portion of a corresponding one of the three jaws, for thereby preventing separation of the fitted portion of the corresponding one of the three jaws from the guide slot defined in a corresponding one of the three slot-defining members; and (e) a jaw driving device configured to cause each of the three jaws to be moved along the guide slot defined in a corresponding one of the three slot-defining members, such that the three jaws are moved in synchronization with one another.

As described above, where the slot-defining members and the pressing members are constituted by members independent of the main body of the chuck, the slot-defining members and the pressing members can be machined independently of the main body of the chuck whereby the chuck as a whole can be machined with a higher degree of freedom in the machining operation. Particularly, where the chuck has a large size with a diameter of, for example, 1000 mm or more as measured in the main body of the chuck, such a large-sized chuck bee to be machined by limited machining equipments that are capable of performing a large-sized work, thereby problematically requiring a long period of time for manufacturing the chuck. The principle of the present invention males it possible to reduce the size of each of parts that are to be machined, thereby widening range of machining equipments available in the machining operation and also shortening the period of time required for manufacturing the chuck.

Further, owing to the arrangement in which the pressing members ere constituted by members independent of the slot-defining members, it is possible to easily improve dimensional accuracy of portions that are fitted with the fitted portion of each of the jaws, and accordingly improve a holding-position accuracy established in the chuck.

Further, owing to the arrangement in which the pressing members are detachable from the slot-defining members, where the holding-position accuracy is deteriorated due to wear of the members, only the slot-defining members and/or the pressing members can be replaced by new ones, whereby the equipment cost can be made lower than a case where the main body as a whole has to be replaced by a new one. Moreover, this arrangement enables the slot-defining members and/or the pressing members to be easily repaired whereby the maintenance cost can be reduced.

There will be described various modes of the invention deemed to contain claimable features for which protection is sought. Hereinafter, the invention deemed to contain the claimable features will be referred to as "claimable invention." where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes anti preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A chuck including:

(a) a main body having a central axis;

(b) three slot-defining members each constituted by a member independent of the main body and defining therein a guide slot, each of the three slot-defining members having slot-opening-side end surfaces in which the guide slot opens, the three slot-defining members being detachably attached to the main body such that the guide slot of each of the three slot-defining members extends in a radial direction that is perpendicular to the central axis of the main body;

(c) three jaws each including (c-1) a fitted portion which is slidably fitted in the guide slot defined in a corresponding one of the three slot-defining members and (c-2) an engaging portion which projects from the fitted portion in an axial direction parallel to the central axis and which is configured to engage with one of an outer circumferential surface and an inner circumferential surface of an object that is to be chucked by the chuck;

(d) three pairs of pressing members each pair of which are detachably fixed to the slot-opal-bag-side end surfaces of the three slot-defining members, each pair of the three pairs of pressing members engaging with engaged surfaces of the fitted portion of a corresponding one of the three jaws, for thereby preventing displacement of the fitted portion of the corresponding one of the three jaws in the axial direction, from the guide slot defined in a corresponding one of the three slot-defining members, the engaged surfaces of the fitted portion of each of the three jaws facing a corresponding pair of the three pairs of pressing members; and (e) a jaw driving device configured to cause each of the three jaws to be moved along the guide slot defined in a corresponding one of the three slot-defining members, such that the three jaws are moved in synchronization with one another.

(2) The chuck according to mode (1), wherein each of the three slot-defining members, the fitted portion of each of the three jaws and each pair of the three pairs of pressing members are made of respective materials each having a higher degree of wear resistance than a material of the main body.

According to the feature described in this mode (2), it is possible to satisfactorily maintain the holding-position accuracy established in the chuck according to mode (1) for a long period of time and accordingly to improve the durability of the chuck.

(3) The chuck according to mode (1) or (2), wherein the opening-location surface of the fitted portion of each of the three jaws lies on a flat plane on which a corresponding one of the slot-opening-side end surfaces of a corresponding one of the three slot-defining members lies on, and wherein each of the pressing members has a surface which faces a corresponding one of the thee slot-defining members and the fitted portion of a corresponding one of the three jaws and which is constituted by a single flat surface.

According to the feature described in this mode (3), it is possible to easily obtain a suitable amount of clearance (as measured in the axial direction, i.e., a direction of depth of the guide slot) that is defined by cooperation of the above-described fitted portion, slot-defining member and pressing member, by simply subjecting each of the slot-opening-side end surfaces of the slot-defining member and/or each of the engaged surfaces of the fitted portion, to a surface grinding operation. It is noted that the above-described engaged surfaces of the fitted portion of each of the three jaws may be defined as surfaces of the fitted portion which are located on side of an opening of the guide slot defined in a corresponding one of the three slot-defining members.

(4) The chuck according to any one of modes (1)-(3), wherein the fitted portion of each of the three jaws has slide surfaces that are to be slid on slide surfaces of a corresponding pair of the three pairs of pressing members and a corresponding one of the three slot-defining members when the each of the three jaws is moved, and wherein the slide surfaces of the fitted portion of each of the three jaws and the slide surfaces of the corresponding pair of the three pairs of pressing members and the corresponding one of the three slot-defining members are hardened and ground surfaces.

According to the feature described in this mode (4), it is possible to improve accuracy of finishing the slot-defining member, fitted portion and pressing member, and also to restrain wear of the slide surfaces. That is, it is possible to easily establish a suitable amount as the clearance required for the slide movement, and also to satisfactorily maintain the suitable amount of the elide clearance for a long period of time.

(5) The chuck according to any one of modes (1)-(4), wherein the main body has three fitting slots provided in a front surface of the main body, such that the three fitting slots extend radially from the central axis and are equi-angularly spaced apart from one another, and wherein the slot-defining members are fitted in the fitting slots, and are fixed to the main body.

According to the feature described in this mode (5), the slot-defining members can be easily positioned in desired positions relative to the main body of the chuck, and can be held by the main body with an increased rigidity. Further, by suitably setting a depth of the fitting slot, the slot-defining members and the pressing members can be fixed to the main body without these members protruding from the front surface of the main body in the axial direction, whereby usability of the chuck can be improved.

(6) The chuck according to any one of modes (1)-(5), wherein each of the three jaws is constituted by a slider including at least the fitted portion and a jaw member including at least the engaging portion, and wherein the slider and the jaw member are detachably fixed to each other.

The jaw member and the slide may be fixed either directly to each other or indirectly to each other with a spacer being interposed therebetween. Further, the jaw member may include a base jaw portion and a top jaw portion which are formed independently of each other and which are detachably fixed to each other, or may include a fixed portion which is fixed to the slider and which is formed integrally with the engaging portion.

According to the feature described in this mode (6), the same slider can be used as a common slider to be combined with a desired one of a plurality of various kinds of jaw members. That is it is possible to cheaply obtain a desired one of a plurality of various kinds of jaws, by preparing the plurality of various kinds of jaw members and selecting one of the plurality of various kinds of jaw members that is to be fixed to the common slider. Further, when one of the jaw members becomes no longer usable, only this one of the jaw members can be replaced by another one of the jaw members, thereby making it possible to reduce the maintenance cost.

(7) The chuck according to mode (6),
wherein the jaw member has a base jaw portion detachably fixed to the slider and a top jaw portion detachably fixed to the base jaw portion,
wherein one of the base jaw portion and the top jaw portion defines a partial inner cylindrical surface having an axis aligned with the central axis, while the other of the base jaw portion and the top jaw portion defines a partial outer cylindrical surface coaxial with the partial inner cylindrical surface,
and wherein the partial inner cylindrical surface and the partial outer cylindrical surface are opposed to each other in a radial direction perpendicular to the central axis and are held in contact with each other whereby a position of the top jaw portion relative to the base jaw portion in the radial direction is defined.

According to the feature described in this mode (7), the top jaw portion can be easily held in a desired position relative to the base jaw portion, and the top jaw portion can be held by the base jaw portion with an increased rigidity.

(8) The chuck according to any one of modes (1)-(7),
wherein the jaw driving device includes:
(e-1) a driving member which is slidably fitted with a central guide that is provided in a central portion of the main body, the driving member being movable in opposite directions parallel to the axial direction; and
(e-2) a movement converting mechanism provided between the driving member and the three jaws, and configured to convert axial movement of the driving member into radial movement of each of the three jaws,
and wherein the movement converting mechanism includes mutually contacted portions that are held in slidable contact with each other, the mutually contacted portions being hardened and ground portions.

According to the feature described in this mode (8), it is possible to easily improve dimensional accuracy of the movement converting mechanism and also to improve durability of the movement converting mechanism.

(9) The chuck according to mode (8),
wherein the movement converting mechanism includes an engaging slot and an engaging protrusion, such that the engaging slot is provided in one of the driving member and each of the three jaws and which extends in a direction inclined with respect to the central axis, and such that the engaging protrusion is provided in the other of the driving member and each of the three jaws and which is slidably fitted in the engaging slot,
wherein the engaging protrusion has slide surfaces that are to be slid on elide surfaces of the engaging slot,
and wherein the slide surfaces of the engaging protrusion and the slide surfaces of the engaging slot are hardened and ground surfaces.

(10) The chuck according to mode (9),
wherein the central guide is defined by a central-guide defining member which is independent of the main body and which is made of a material having a higher degree of wear resistance than a material of the main body,
wherein the central-guide defining member is fixed to the main body, and has a slide surface that is to be slid on a slide surface of the driving member,
and wherein the slide surface of the central-guide defining member and the slide surface of the driving member are hardened and ground surfaces.

According to the feature recited in this mode (10), it is possible to easily obtain a suitable amount of fitting clearance between the central-guide defining member and the driving member owing to an improved machining accuracy of the central-guide defining member as well as that of the driving member, and also to improve durability of the central-guide defining member and the driving member.

(11) The chuck according to mode (10), wherein the central-guide defining member is detachably fixed to the main body.

According to the feature recited in this mode (11), the holding-position accuracy of the chuck can be easily maintained by repairing the central-guide defining member or replacing the central-guide defining member with a new one.

(12) A hybrid chuck including:
an electromagnetic chuck portion including at least one electromagnet that is provided integrally in a main body of the chuck, the electromagnetic chuck portion being configured to chuck an object which is made of a magnetic material and which is to disposed on a front surface of the main body, by sucking the object owing to a magnetic suction force generated by the at least one electromagnet; and
a three-jaw chuck portion including: three jaws disposed in the main body and movable along a front surface of the main body in respective radial directions that are perpendicular to a central axis of the main body; and a jaw driving device configured to move the three jaws in synchronization with one another.

The electromagnetic chuck portion provides, owing to its arrangement for chucking an object with a flat end face of the object being held in close contact directly with the front surface of the main body or indirectly with the front surface via a stopper or stoppers, an advantage that it is possible to avoid the chucked object from being distorted or deformed. However, the electromagnetic chuck portion suffers from a disadvantage that it takes a long time for carrying out an operation for centering the object because of absence of self-centering function therein. Further, another disadvantage is that the object to be chucked by the electromagnetic chuck portion has to be necessarily made of a magnetic material, due to the arrangement in which displacement of the object relative to the chuck is prevented by friction generated, based on the magnetic suction force, between the front surface of the chuck and the flat end face of the object.

Meanwhile, the three-jaw chuck portion provides advantages that an object can be easily chucked and unchucked owing to presence of the self-centering function, and that the object can be firmly chucked owing to the three jaws cooperating to hold the objects. However, the three-jaw chuck portion suffers from a disadvantage that the chucked object could be deformed to a so-called rice-ball-like shape (i.e., triangle-like shape), for example. Further, as another disadvantage, there is a tendency that displacement (i.e., separation) of the object away from the main body of the chuck could be allowed upon chucking of the object, due to presence of clearance for slide movement of the jaws. This disadvantage could be a factor causing reduction of the holding-position accuracy.

On the other hand, in the hybrid chuck according to this mode (12), it is possible to enjoy the advantages of both of, the three-jaw chuck portion and the electromagnetic chuck portion while avoiding problems based on the disadvantages of both of the two chuck portions, by using a suitably selected one of the two chuck portions or using both of the two chuck portions.

For example, it is possible to employ a chucking process including: a jaw chucking step that is implemented to cause the three-jaw chuck portion to chuck an object, so as to center the object by utilizing the self-centering function of the three-jaw chuck portion; a magnetic chucking step implemented to energize the electromagnet so as to cause the electromagnetic chuck portion to chuck the centered object; and a jaw unchucking step implemented to cause the three-jaw chuck portion to unchuck the object. In the jaw chucking step in which the object is temporarily chucked by the three-jaw chuck portion for the purpose of centering the object, the object does not have to be chucked with a large force, and the object is eventually unchucked by the three-jaw chuck portion, so that the object is unlikely to suffer from undesirable deformation. In this sense, this chucking process provides the advantage that is effective, particularly, in a case where the chucked object is a tubular or annular-shaped object.

Further, it is possible to employ another chucking process without the above-described jaw unchucking step. That is, in this chucking process, an object is firmly chucked by both of the electromagnetic chuck portion and the three-jaw chuck portion. This chucking process provides the advantage that is enjoyable, particularly, in a case where the chucked object is an object which has a high degree of rigidity and which is to be subjected to a heavy machining operation.

Moreover, the hybrid chuck according to this mode (12) can be used for chucking any one of various kinds of objects, by using one of the electromagnetic chuck portion and the three-jaw chuck portion, which is selected depending on characteristics of the object that is to be chucked.

It is noted that a driving force generated by the jaw driving device is controllable to vary, preferably, over a wide range, from point of view of widening range of application of this hybrid chuck. Namely, it is preferable that the jaw driving device is switchable between at least two modes such that the driving force generated by the jaw driving device is made relatively large when the jaw driving device is placed in one of the two modes and such that the driving force is made relatively small when the jaw driving device is placed in the other of the two modes.

(13) The hybrid chuck according to mode (12), wherein the three-jaw chuck portion further includes three guides which are provided in the front surface of the main body and which are equi-angularly spaced apart from one another in a circumferential direction of the main boy, such that the three jaws are guided by the three guides, respectively, in the respective radial directions, and wherein the at least one electromagnet consists of a plurality of electromagnets each of which is disposed between a corresponding pair of the three guides in the circumferential direction.

(14) A hybrid hock according to mode (12) or (13), wherein the jaw driving device includes:

a driving member which is slidably fitted with a central guide that is provided in a central portion of the main body, the driving member being movable in opposite directions parallel to the central axis; and a movement converting mechanism provided between the driving member and the three jaws, and configured to convert axial movement of the driving member into radial movement of each of the three jaws.

(15) A hybrid chuck according to mode (14), further including:

a biasing device biasing the driving member relative to the main body in a forward direction that is one of the opposite directions parallel to the axial direction; and a force receiving portion configured to receive, from a front side of the front surface of the main body, a backward force forcing the driving member to be moved, against a biasing force generated by the biasing device in a backward direction that is the other of the opposite directions.

In the hybrid chuck according to this mode (15), it is preferable that the backward force, which is to be applied to the force receiving portion upon use of the self-centering function of the three-jaw chuck portion, is applied from a movable portion of a machine on which the chuck is to be installed. For example, where the chuck is installed on a machine tool having a moving member for moving a machining tool, it is possible to cause the moving member itself or an operating member attached to the moving member to be brought into contact with the force receiving portion, so as to apply the backward force to the force receiving portion. To this end, namely, to facilitate reception of the backward force by the force receiving portion, it is preferable that the force receiving portion projects forwardly from the front surface of the main body of the chuck.

In the hybrid chuck according to his mode (15), it is not necessary to drive the driving member from a rear side of the main body of the chuck, so that there is an advantage that a limited space in the central portion of the main body of the chuck is available for wiring arrangement for supply of electric current to the electromagnetic chuck portion.

(16) The hybrid chuck according to mode (14) or (15), wherein the driving member includes a connection portion that is to be connected to a drive rod on a rear side of the front surface of the main body of the chuck, such that the driving member is movable by the drive rod in the opposite directions parallel to the central axis.

The three-jaw chuck portion in the hybrid chuck according to this mode (16) has a construction similar to that of an ordinary three-jaw chuck. The hybrid chuck may be provided with both of the connection portion described in this mode (16) and the connection portion described in the above mode (15), so as to have an excellent versatility.

(17) The hybrid chuck according to any one of modes (12)-(16), further including a control device configured to control activations of the three-jaw chuck portion and the electromagnetic chuck portion, wherein the control device includes at least one of (i) a first controlling portion configured to place a selected one of the three-jaw chuck portion and the electromagnetic chuck portion, in a chucking state, (ii) second controlling portion configured to place the three-jaw chuck portion in the chucking state for thereby centering the object, and then to place the electromagnetic chuck portion in the chucking state while placing the three-jaw chuck portion in an unchucking state, and (iii) a third controlling portion configured to place both of the three-jaw chuck portion and the electromagnetic chuck portion in the chucking state concurrently with each other.

In the second controlling portion of the hybrid chuck according to this mode (17), after the object has been centered by the three-jaw chuck portion, the transition of the electromagnetic chuck portion from the unchucking state to the chucking state and the transition of the three-jaw chuck portion from the chucking state to the unchucking state do not necessarily have to take place in order of the above description, as is obvious from below description of DETAILED DESCRIPTION OF THE PREFERRED EMBODIMENTS. It is noted that the control device does not necessarily have to be interpreted to constitute a part of the hybrid chuck as in this mode (17) but may be interpreted to cooperate with the hybrid chuck to constitute a chucking system.

(18) The hybrid chuck according to any one of modes (12)-(17), wherein the three-jaw chuck portion that is constituted by the chuck defined in any one of modes (1)-(11).

In the hybrid chuck according to this mode (18), it is possible to further improve the centering accuracy of the three-jaw chuck portion, and accordingly to cause the electromagnetic chuck portion to chuck the object that is centered with a high centering accuracy. In addition to such a high holding-position accuracy, this hybrid chuck provides an advantage that avoids deformation of the object, so as to constitute an ideal chuck. Further, even in a case where the three-jaw chuck portion as well as the electromagnetic chuck portion is placed in the chucking state, it is possible to minimize displacement of the chucked object away from the main body of the chuck by the three jaws. Thus, it can be the that this hybrid chuck constitutes an ideal, chuck that establishes a high holding-position accuracy and a high holding rigidity.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
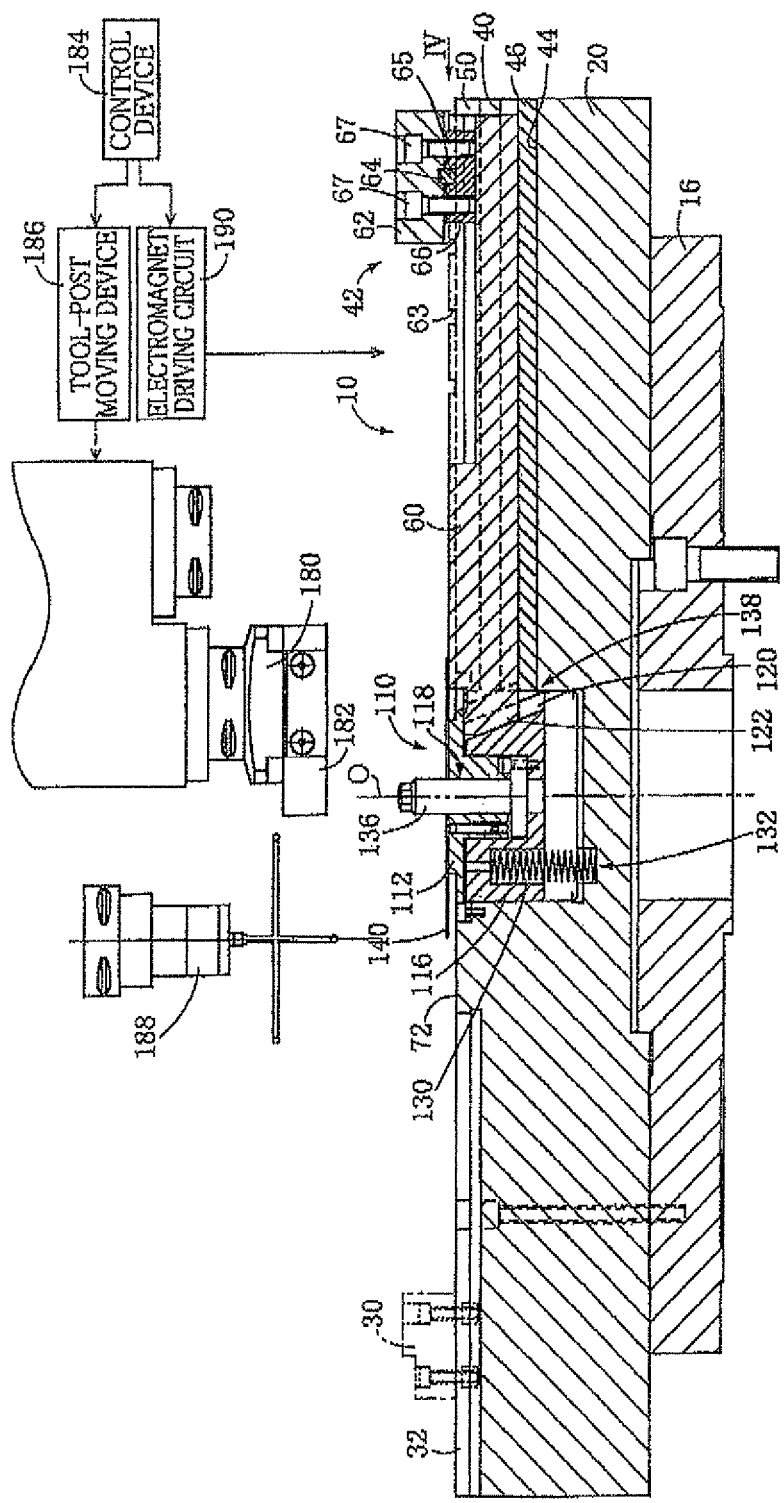
FIG. 1 is an axial cross sectional view showing a hybrid chuck constructed according to an embodiment of the invention.
Figure 2:
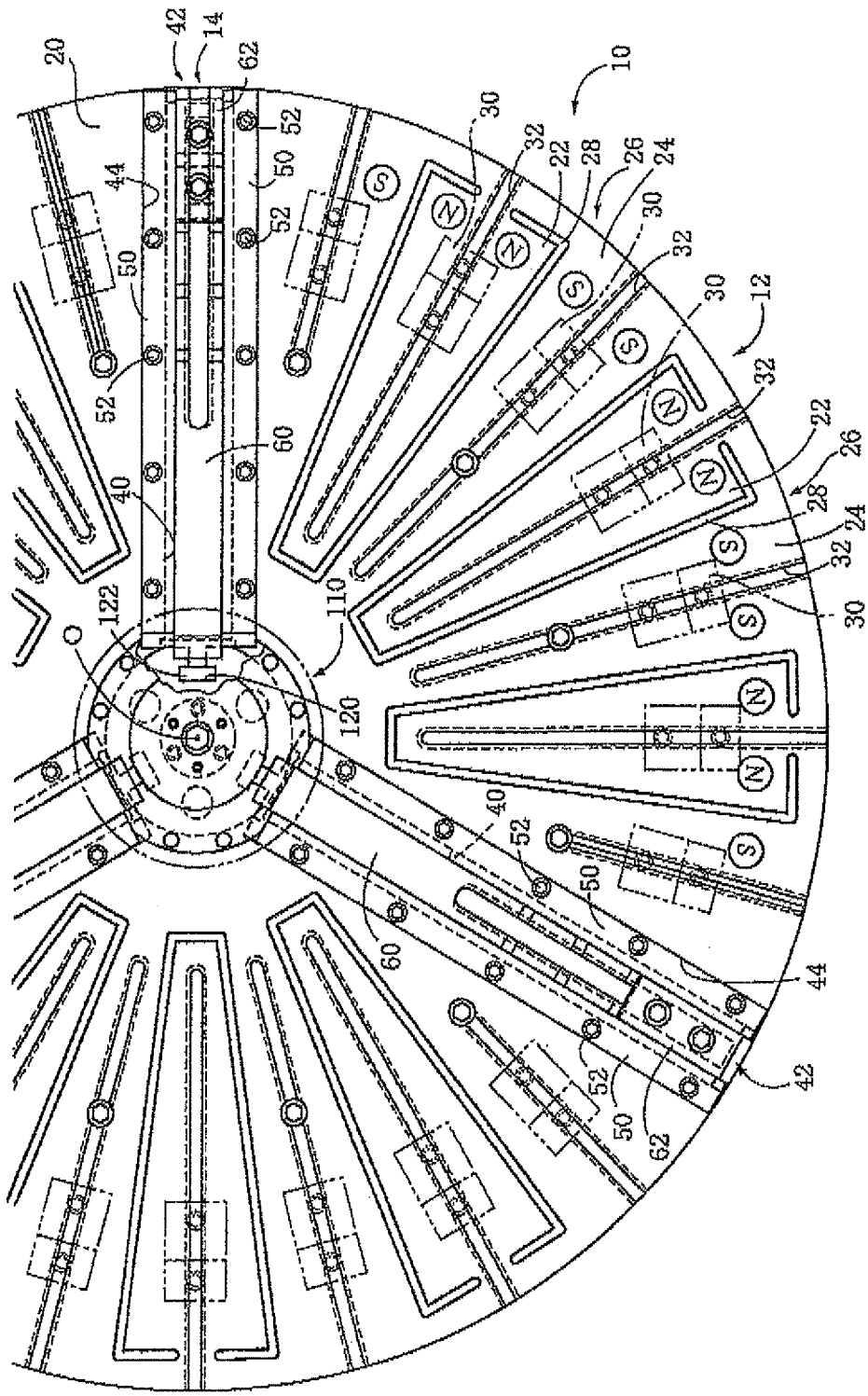
FIG. 2 is a front view showing a part of the hybrid chuck of FIG. 1.

Referring first to FIGS. 1-4, there will be described a hybrid chuck 10 that is constructed according to an embodiment of the invention. The hybrid chuck 2 has an electromagnetic chuck portion 12 and a three-jaw chuck portion 14 as an universal chuck portion, as shown in FIG. 2, and is to be mounted on a machine tool such as a vertical lathe (i.e., vertical turning center). FIG. 1 shows, by way of example, an arrangement in which the hybrid chuck 10 is attached to a rotary table (i.e., spindle nose) 16 of the vertical lathe, which has a diameter as large as 1000 mm.

Although the electromagnetic chuck portion 12 which is basically the same as conventional electromagnetic chuck will not be described in detail herein, this electromagnetic chuck portion 12 is formed integrally with a main body 20 of the chuck 10, and has a total of 18 electromagnets 26 each including a N-pole 22 and a S-pole 24. In the main body 20, there are embedded separators 28 made of non-magnetic material (made of epoxy resin in the present embodiment). Each of the separators 28 serves to electromagnetically separate the N-pole 22 and S-pole 24 of a corresponding one of the electromagnets 26 from each other. The 18 electromagnets 26 are sectioned into three groups, such that each group consist of six electromagnets 26 in the example shown in FIG. 2. The three groups of electromagnets 26 are equi-angularly disposed around a central axle O of the chuck main body 20. A total of 21 T-slots 32 are provided in the chuck main body 20 so as to extend in respective radial directions perpendicular to the central axis O. A plurality of stoppers 30 are engaged with the respective T-slots 32 so as to be attached to the chuck main body 20. It is noted that each seven. T-slots 32 are provided for a corresponding one of the three groups of the electromagnets 26 in the example shown in FIG. 2.

The three-jaw chuck portion 14 has three jaws 42 that are simultaneously movable in respective radial directions along respective three guide sloth 40 each of which is provided between a corresponding two of the three groups of electromagnets 26 as viewed in a circumferential direction of the chuck main body 20. The three guide skits 40 are defined in respective three slot-defining members 46 fitted in respective three fitting slots 44 that are defined in the chuck main body 20 (see FIG. 4). Each of the three slot-defining members 46 has a pair of slot-opening-side end surfaces 48 in which an opening of a corresponding one of the three guide slots 40 opens. A pair of pressing members 50 are held in close contact with the pair of slot-opening-side end surfaces 48, and are fixed together with the slot-defining member 46 to the chuck main body 20 by means of a plurality of screw bolts 52 (see FIG. 4).

Figure 4:
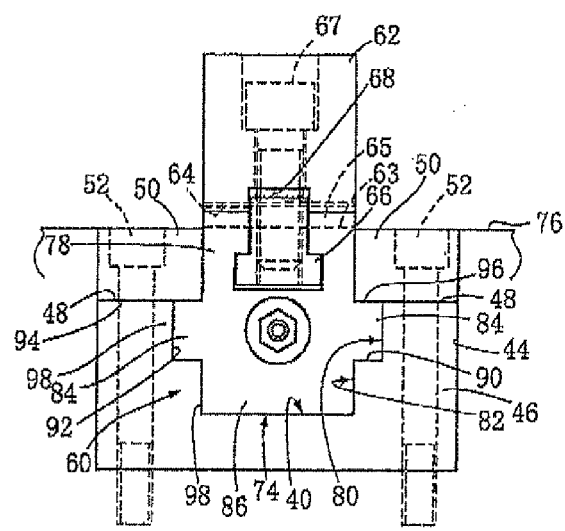
FIG. 4 is view as seen in a direction indicated by arrow IV in FIG. 1.

As shown in FIG. 1, each of the three jaws 42 has a slider (master jaw) 60 and a jaw member 62 that is fixed to the slider 60. The three jaw members 62 cooperate to grasp or hold an object, and each of the three jaw members 62 has an engaging portion that is to engage with an outer circumferential surface or an inner circumferential surface of the object. The jaw member 62 can be fixedly positioned in a selected one of a plurality of positions relative to the slider 60 in a radial direction of the chuck main body 20. The positioning of the jaw member 62 relative to the slider 60 in the radial direction is made by cooperation of key grooves 63, 64 and a key 65. The key grooves 63, 64 are provided in surfaces of the slider 60 and the jaw member 62 that are opposed to each other. The key 65 is fitted in the key groove 64 (provided in the opposed surface of the jaw member 62) and a selected one of the key grooves 63 (provided in the opposed surface of the slider 60) so that the jaw member 62 and the slider 60 are fixed to each other through the key 65 bridging between the key groove 64 and the selected key groove 63. That is, by selecting one of the plurality of key grooves 63 that is to be engaged with the key groove 64 through the key 65, the jaw member 62 can be fixedly positioned in a selected one of the plurality of positions relative to the slider 60 in the radial direction. The jaw member 62 is fixed to the slider 60 by thread engagement of screw bolts 67 and a T-block (T-nut) 66 that is received in a T-slot provided in the slider 60. As best shown in FIG. 4, a groove 68 is provided in a bottom surface (i.e., the above-described opposed surface) of the jaw member 62, and a top end portion of the T-block 66 is fitted in the groove 68, whereby the jaw member 62 is fixedly positioned relative to the slider 60 in the circumferential direction. Thus, the above-described key grooves 63, 64, key 66, T-block 66 and groove 68 cooperate to constitute a positioning device for fixedly positioning the jaw member 62 in a desired position relative to the slider 60 in the radial direction and also in the circumferential direction.

Figure 5:
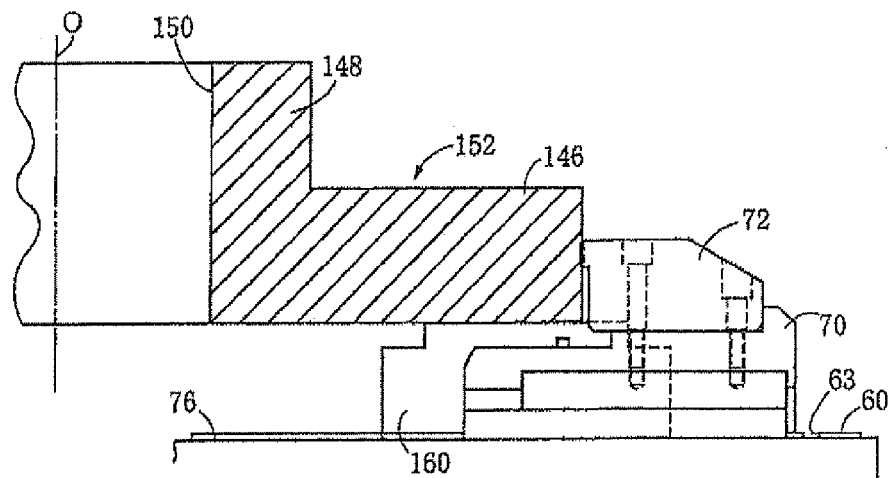
FIG. 5 is an axial cross sectional view showing a workpiece that is chucked by the hybrid chuck.

The jaw member 62 shown in FIGS. 1 and 4 is provided by a single piece that is to be attached directly to the slider 60. However, the jaw member does not necessarily have to be provided by a single piece, but may be provided by a plurality of pieces such as a base jaw portion 70 and a top jaw portion 72 that are shown in FIG. 5. The base jaw portion 70 is detachably attached to the slider 60, and the top jaw portion 72 is detachably attached to the base jaw portion 70. Like the above-described jaw member 62, the base jaw portion 72 is fixedly positioned, by a positioning device, relative to the slider 60 in the radial direction and in the circumferential direction. The positioning of the top jaw portion 72 relative to the base jaw portion 70 will be described later.

The slider 60 has a fitted portion 74 and a protruding portion 78 (that may be referred also to as "top portion"), as best shown in FIG. 4. The fitted portion 74 is fittable in the guide, slot 40 defined in the slot-defining members 46. The protruding portion 78 extends from the fitted portion 74 in a forward direction (i.e., upward direction as seen in FIG. 4) parallel to the above-described axial direction, and passes through a space defined between the pair of pressing members 50, so as to protrude from a front surface 76 of the chuck main body 20 in the forward direction. Although the guide slot may have a simple rectangular cross-sectional shape, the guide slot 40 shown in FIG. 4 is shaped to include a large-width portion 80 and a small-width portion 82 such that the large-width portion 80 is located on the side of the above-described opening of the guide slot 40. The slider 60 has a omelets cross-sectional shape, and includes a pair of aria portions 84, a leg portion 86 and the above-described protruding portion 78. The arm portions 84 of the slider 60 are constituted by a portion of the slider 60 that corresponds to a horizontal bar of the cross, and are fitted in the large-width portion 80 of the guide slot 40. The leg portion 86 of the slider 60 is constituted by a portion of the slider 60 that corresponds to a lower portion of a vertical, bar of the cross, and is fitted in the small-width portion 82 of the guide slot 40. The protruding portion 78 of the slider 60 is constituted by a portion of the slider 60 that corresponds to an upper portion of the vertical bar of the cross.

While the chuck main body 20 is made of a cast iron, each of the slot-defining members 46 and the pressing members 50 is made of a material (e.g., high carbon steel S50C) that is hardenable by heat treatment. Thus, each of the slot-defining members 46 and the pressing members 50 is a member which has been subjected to a hardening operation so as to be hardened. Further, each of these members 46, 50 has slide surfaces that has been subjected to a grinding operation (implemented after the hardening operation) in which the slide surfaces are accurately ground so as to assure precisely a suitable amount of clearance for allowing slide movement of the slider 60 relative to the slot-defining member 46 and the pressing members 50. Specifically described, shoulder surfaces 90 located between the large-width portion 80 and the small-width portion 82, opposite side surfaces 92 of the large-width portion 80 (or opposite side surfaces of the small-width portion 82), the slot-opening-side end surfaces 48 of the slot-defining member 46 and bottom surfaces 94 of the pressing members 50 (held in close contact with the slot-opening-side end surfaces 48) are the slide surfaces that has been subjected to the grinding operation. Meanwhile, the slider 60 is also made of a material that is hardenable by heat treatment. In the present embodiment, the slider 60 is made of for example, chrome molybdenum steel SCM415, and has surfaces hardened by carburizing and quenching. Opposite side surfaces 96 of each of the arm portions 84 of the slider 60 (which are distant from each other in the axial direction of the chuck main body 20) and opposite side surfaces 98 of the respective arm portions 84 of the slider 60 (which are distant from each other in the circumferential direction of the chuck main body 20) are ground surfaces that have been ground in grinding operations carried out after the carburizing and quenching. It is noted that, in place of the opposite side surfaces 98 of the respective arm portions 84, the opposite side surfaces 98 of the leg portion 86 may be ground surfaces. It is also noted that a front one of the opposite side surfaces 96 of each of the arm portions 84, which is located on the side of the slot-opening-side end surface 48 of the slot-defining members 46, is substantially flush with the slot-opening-side end surface 48, and constitutes an engaged surface with which the pressing member 50 engages.

Among the above-described ground surfaces, the slot-opening-side end surfaces 48 of the slot-defining member 46 or one of the opposite side surfaces 96 of each of the arm portions 84 of the slider 60 is ground with gauging, such that a distance between each of the shoulder surfaces 90 and a corresponding one of the bottom surfaces 94 is larger than a thickness of a corresponding one of the arm portions 84 by 5 µm or less. That is, the slot-opening-side end surfaces 48 of the slot-defining member 46 or one of the opposite side surfaces 96 of each of the arm portions 84 is ground while the difference between the above-described distance and thickness is checked as needed (, rather than being ground relying on only dimensions of each part indicated in a drawing), such that the difference which corresponds to the slide clearance can be reliably held within a predetermined tolerance of 5 µm or lees. Further, another difference (i.e., slide clearance) between a distance between the opposite side surfaces 92 of the large-width portion 80 and a distance between the opposite side surfaces 98 of the respective arm portions 84 is held within a predetermined tolerance of 10 µm or less. On the other hand, the other surfaces of the slot-defining member 46, pressing members 50 and slider 60 define clearances that are intentionally designed to be relatively large, thereby eliminating necessity of grinding these other surfaces with high precision.

It is noted that a difference (i.e., slide clearance) between a distance between opposite side surfaces of the small-width portion 82 and a distance between opposite side surfaces of the leg portion 86 (i.e., thickness of the leg portion 86) may be held within a predetermined tolerance of 10 µm or less. Further, where the guide slot has a rectangular cross sectional shape, it is possible to control a slide clearance of the slider 60 in the above-described axial direction (i.e., vertical direction as seen in FIG. 4) by controlling a distance between the bottom surface of the guide slot and the slot-opening-side end surfaces and also the depth of the fitted portion (i.e., length of the fitted portion as measured in the axial direction).

Figure 3:
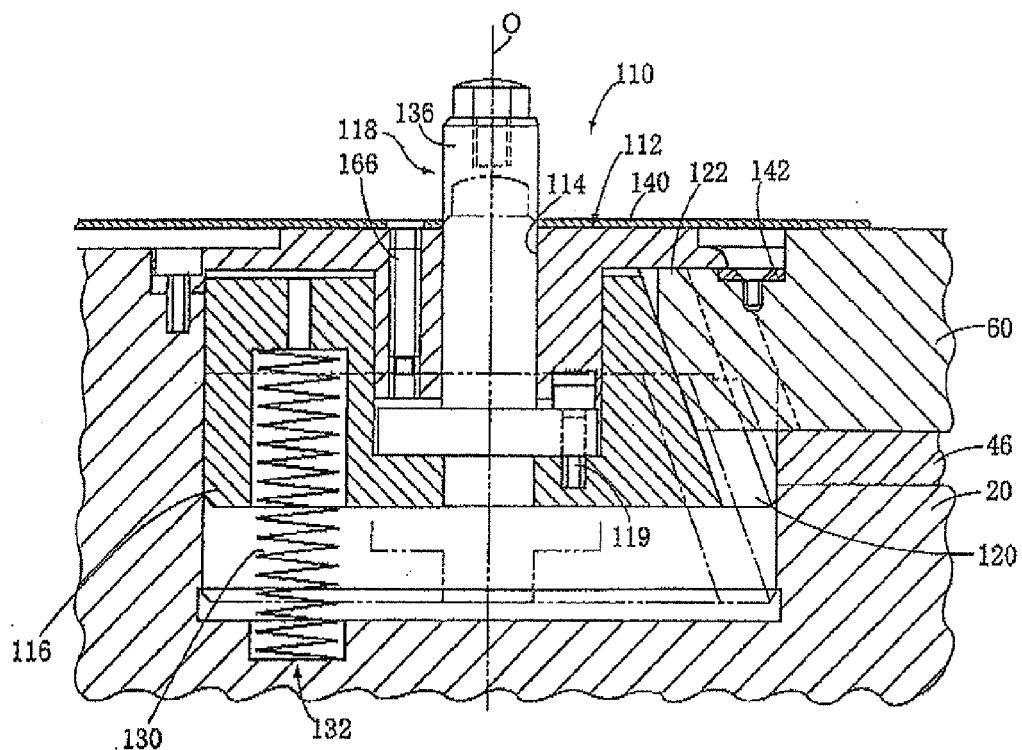
FIG. 3 is a view showing in enlargement a part of FIG. 1.

The three jaws 42 of the three-jaw chuck portion 14 are movable in the respective radial directions, by a jaw driving device 110, in synchronization with one another. As shown in FIG. 3, the jaw driving device 110 has a central-guide defining member 112 fixed to the chuck main body 20 and a driving member 116 movable opposite directions parallel to the axial direction, such that the axial movement of the driving member 116 is guided by a central hole 114 of the central-guide defining member 112. The driving member 116 is detachably attached to a shaft member 118 by means of screw bolts 119, and the shaft member 118 is slidably fitted in the central hole 114.

The driving member 116 has three engaging slots in the form of T-slots 120 which are provided in respective portions of an outer periphery of the driving member 116, which are spaced apart from one another by 120° in the circumferential direction. Each of the T-slots 120 is inclined with respect to the central axis O. Meanwhile, the slider 60 of each of the three jaws 42 has a T-shaped protrusion 122 that is provided in an radially inner end portion of the slider 60. The T-shaped protrusion 122 has a T-shape in its cross section so as to be precisely fitted in a corresponding one of the T-slots 120. The driving member 116 is biased or constantly forced in the forward direction (i.e., upward direction as seen in FIG. 3) by a biasing device 132 that is constituted principally by a plurality of compression coil springs 130 disposed between the driving member 116 and the chuck main body 20. The three jaws 42 are normally held in respective opened positions, and are radially inwardly moved when the driving member 116 is moved in a backward direction (i.e. downward direction as seen in FIG. 3) upon application of a backward force to a projecting portion 136 of the shaft member 118 which projects forwardly from the front surface 76 of the chuck main body 20. As a result of radially inward movements of the three jaws 42, the object is centered, namely, an axis of the object is made aligned with the central axis O of the chuck main body 20. In the present embodiment, the T-slots 120 and the T-shaped protrusions 122 are mutually contacted portions that are held in slidable contact with each other, and cooperate to constitute a movement converting mechanism 138 that is configured to convert axial movement of the driving member 116 into radial movement of each of the three jaws 42. Further, the projecting portion 136 of the shaft member 118 constitutes a force receiving portion. A cover plate 140 is attached to the central-guide defining member 112, for thereby preventing entry of foreign substances into the movement converting mechanism 138. Further, a cover member 142 is attached to the radially inner end portion of the slider 60, so as to cooperate with the cover plate 140 to constitute double protection against entry of foreign substances.

Each of the central-guide defining member 112, the driving member 116 and the shaft member 118 is made of a material (e.g., carbon steel S45C) that is hardenable by heat treatment (hardening in the present embodiment). Thus, each of the central-guide defining member 112, the driving member 116 and the shaft member 118 is a member which has been subjected to a hardening operation so as to be hardened. Further, the inner circumferential surface of the central hole 114 and the outer circumferential surface of the shaft member 118 are surfaces that have been accurately ground. Further, the T-slots 120 and the T-shaped protrusions 122 are hardened and have slide surfaces that have been accurately ground.

As described briefly above, the jaw member 62 shown in FIGS. 1 and 4 may be replaced by the jaw member having the base jaw portion 70 and the top jaw portion 72 as shown in FIG. 5. In an example shown in FIG. 5, the object to be chucked by the chuck 10 is an annular-shaped workpiece 152 which is constituted by a large-diameter portion 146 and a small-diameter portion 148 and which has a through-hole 150 located at the center of the workpiece 152. This annular-shaped workpiece 152 is clamped or held at an outer circumferential surface of the large-diameter portion 146 by cooperation of the top jaw portions 72 of the respective jaw members, with an end face of the large-diameter portion 146 being held in contact with the front surface 76 of the chuck main body 20 via stoppers 160.

The above-described base jaw portion 70 and top jaw portion 72 are accurately machined in accordance with a machining process in which these jaw portions 70, 72 of each jaw member are cut or machined while being attached to a corresponding one of the sliders 60 of the hybrid chuck 10. That is, this machining process is executed while these jaw portions 70, 72 are being fixedly mounted on the chuck 10 itself, which is to be used for chucking the workpiece 152 via these jaw portions 70, 72 during machining of the workpiece 152. In this sense, hereinafter, this machining process will be referred to as "self-cutting process".

Figure 6:
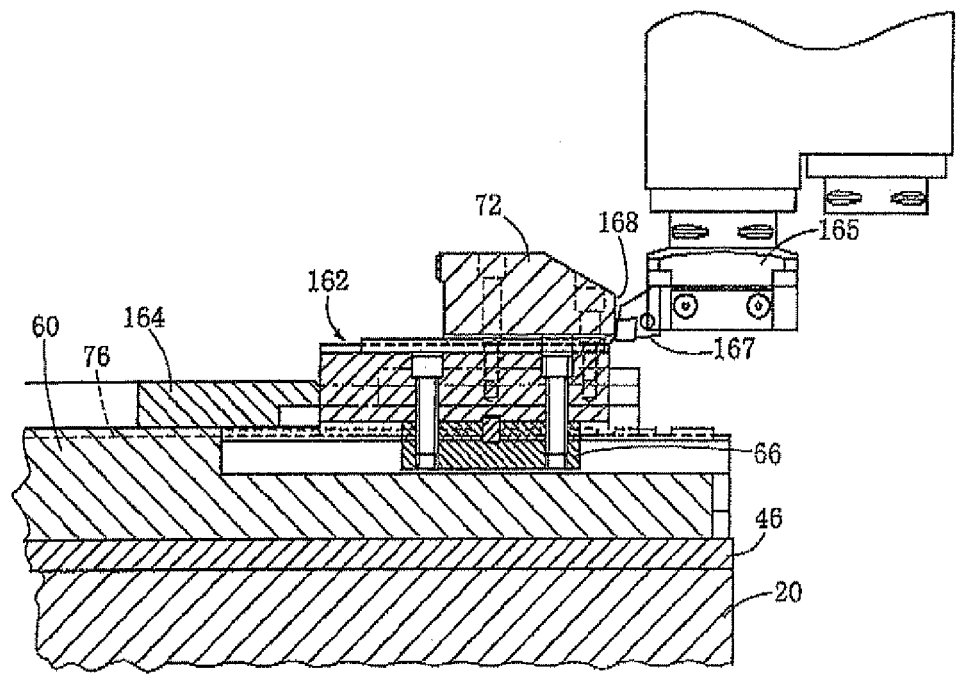
FIG. 6 is a view showing a step of a self-cutting process for machining jaws of the hybrid chuck.

This process is initiated with a top-jaw outside-surface cutting step that is implemented for cutting radially outside surfaces of the respective three top jaw portions 72, as shown in FIG. 6. In this top-jaw outside-surface cutting step, prior to a cutting operation of this step, the three top jaw portions 72 are fixed to the respective three sliders 60 via respective three top-jaw cutting jigs 162, and the three sliders 60 are fixedly positioned in respective positions in the radial direction, with the three top-jaw cutting jigs 162 being held in contact with an outer circumferential surface of an annular-shaped, jig 164 that is supported on the three sliders 60. In this instance, for causing the three sliders 60 to be moved radially inwardly to the above-described respective positions, a tool post 165 of a vertical lathe (not shown) as a machine tool is moved down to be brought into contact with the projecting portion 136 of the shaft member 118 (see FIG. 3), for thereby causing the driving member 116 to be moved backwardly against biasing force generated by the biasing device 132 until the three top-jaw cutting jigs 162 are brought into contact with the outer circumferential surface of the annular-shaped jig 164. The driving member 116 can be kept positioned in such a backwardly moved position that keeps the three top-jaw cutting jigs 162 being contact with the outer circumferential surface of the annular-shaped jig 164, by means of a set screw bolt 166 (see FIG. 3) that is screwed to be held in contact with a flange portion of the shaft member 118. After the set screw bolt 166 has been brought into contact with the flange portion of the shaft member 118, the tool post 165 is moved away from the projecting portion 136. Then, in this top-jaw outside-surface cutting step, the cutting operation is carried out whereby the radially outside surfaces of the respective three top jaw portions 72 are cut by a cutting tool 167 attached to the tool post 165, while the chuck 10 is being rotated about the central axis O together with a spindle of the vertical lathe. In this cutting operation, the radially outside surfaces of the respective three top jaw portions 72 are cut to respective part-cylindrical convex surfaces 168 that defines parts of a cylinder having a predetermined diameter.

Figure 7:
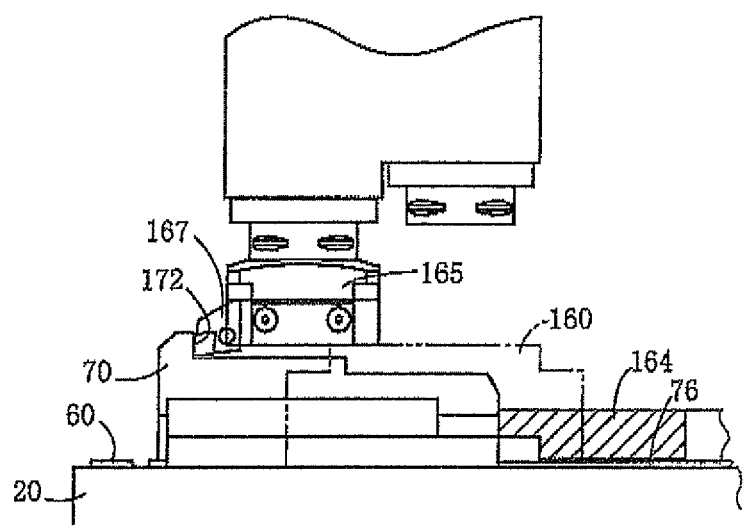
FIG. 7 is a view showing another step of the self-cutting process.

After the top jaw outside-surface cutting step has been carried out as described above, a base-jaw inside-surface cutting step is implemented for cutting radially inside surfaces of the respective three base jaw portions 70, as shown in FIG. 7. In this base-jaw inside-surface cutting step, the three base jaw portions 70 are attached to the respective three sliders 60, and the radially inside surfaces of the respective three base jaw portions 70 are cut to respective part-cylindrical concave surfaces 172 having the same radius of curvature as the above-described part-cylindrical convex surfaces 168 of the respective three top jaw portions 72.

Figure 8:
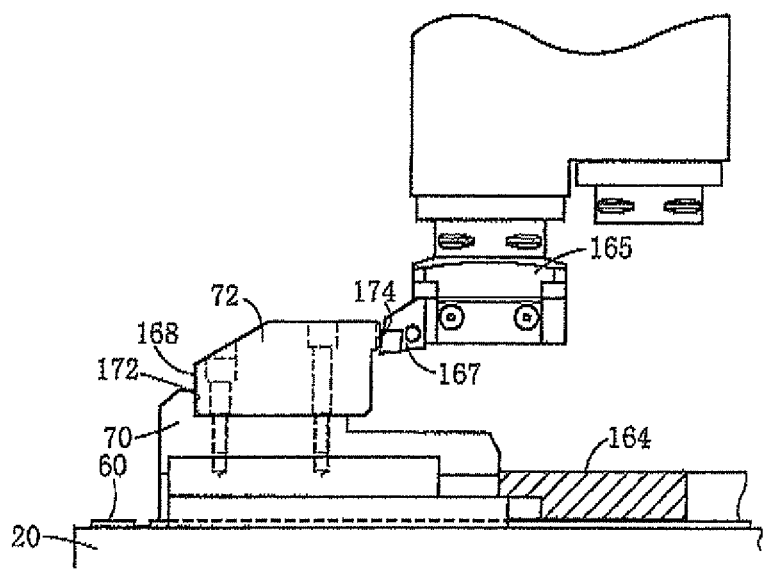
FIG. 8 is a view showing still another step of the self-cutting process.

After the base-jaw inside-surface cutting step has been, carried out as described above, a top-jaw inside-surface cutting step is implemented for cutting radially inside surfaces of the respective three top jaw portions 72, as shown in FIG. 8. In this top-jaw inside-surface cutting step, the top jaw portions 72 are attached to the respective base jaw portions 70, with the part-cylindrical convex surfaces 168 being in contact with the respective part-cylindrical concave surfaces 172, and the radially inside surfaces of the respective three top jaw portions 72 are cut to respective part-cylindrical concave surfaces having the same radius of curvature as the large-diameter portion 146 of the workpiece 152 or radius of curvature slightly larger than that of the large-diameter portion 146 of the workpiece 152. The part-cylindrical concave surfaces of the respective three top jaw portions 72 obtained in this step serve as contact surfaces 174 that is to be brought into contact with an outer circumferential surface of the large-diameter portion 146 of the workpiece 152.

Owing to the machining of the base and top jaw portions 70, 72 in accordance with the self-cutting process as described above, the contact surfaces 174 can be accurately positioned in respective positions lying on a circle whose center is aligned with the central axis O of the chuck main body 20, namely, with an axis of the spindle of the vertical lathe.

Figure 9:
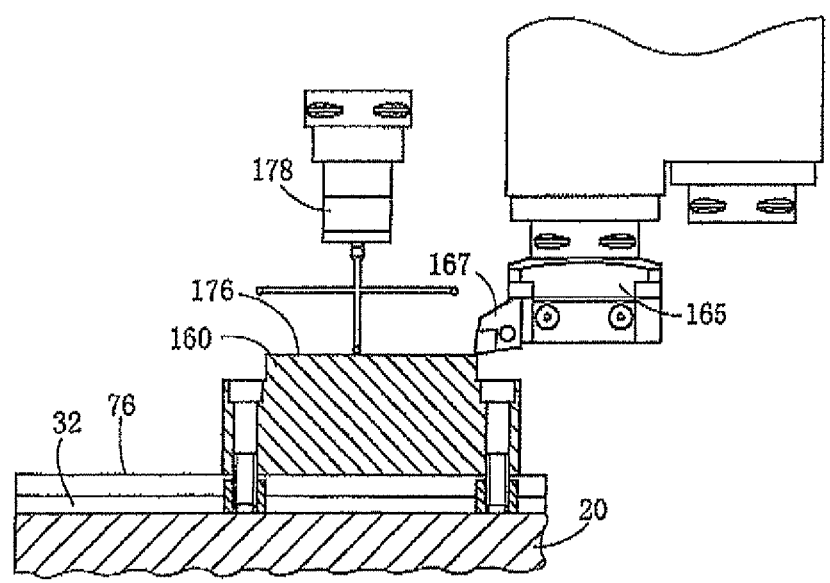
FIG. 9 is a view showing a self cutting process for machining a stopper of the hybrid chuck.

In addition to the base and top jaw portions 70, 72, the above-described stopper 160 is machined while being fixed to the chuck main body 20. Specifically, as shown in FIG. 9, a contact surface 176, with which the workpiece 152 is to be held in contact, is machined, such that the workpiece 152 can be accurately positioned in a desired position in the axial direction when being chucked by the chuck 10. In this instance, a height (i.e., axial length) of the stopper 160 can be checked by employing a touch probe 178.

The above-described annular-shaped jig 164 can be, used also for checking the centering accuracy of the jaws 42 of the chuck 10 that is mounted on a machine tool having a tool post 180, a control device 184 and a tool-post moving device 186 (see FIG. 1). Specifically described, the annular-shaped jig 164 is supported on the front surface 76 of the chuck main body 20 via a suitable stopper or stoppers. Then, by controlling the tool-post moving device 186 by the control device 184, the tool post 180 itself or an operating member 182 attached to the tool post 180 is brought into contact with the projecting portion 136 of the shaft member 118, so as to cause the driving member 116 to be moved in the backward direction, and to cause the three jaws 42 to be radially inwardly moved, whereby the annular-shaped jig 164 are held by the radially inwardly moved jaws 42. Then, while the annular-shaped jig 164 are being held by the jaws 42, a touch probe 188 is brought into contact with an outer or inner circumferential surface of the annular-shaped jig 164, so that the centering accuracy of the jaws 42 can be checked by causing the chuck 10 to be rotated. It is noted that, where the chuck 10 is mounted on a vertical lathe or vertical grinder, namely, where the front surface 76 of the mounted chuck 10 faces upwardly, the annular-shaped jig 164 and the stopper or stoppers may be simply put on the front surface 76.

Where a workpiece made of a magnetic material is to be machined, the workpiece can be chucked by the hybrid chuck 10 in accordance with a chucking process as described below. This chucking process is initiated with a centering step in which the workpiece is supported on the front surface 76 of the chuck main body 20 via the stoppers 30 that are attached to the front surface 76 of the chuck main body 20 (the use of the stoppers 30 is not indispensable), and then the axis of the workpiece is made aligned with the central axis O of the chuck main body 20 by causing the three jaws 42 to be radially inwardly moved in the same manner as in the above-described case in which centering accuracy of the jaws 42 is checked, so that the workpiece is chucked by the three-jaw chuck portion 14. In a magnetically chucking step following the centering step, the electromagnets 26 are energized by controlling an electromagnet driving circuit 190 by the control device 184, so as to magnetize the chuck main body 20 whereby the workpiece is firmly chucked through the stoppers 30 made of the magnetic material by the electromagnetic chuck portion 12 while the workplace is chucked also by the three-jaw chuck portion 14. Then, in this magnetically chucking step, the tool post 180 or the operating member 182 is separated from the projecting portion 136 of the shaft member 118, whereby the shaft member 118 and the driving member 116 are allowed to be moved in the forward direction, and the three jaws 42 are allowed to be radially outwardly moved. Thus, consequently, the chucking of the workpiece by the three-jaw chuck portion 14 is released so that the workpiece is kept chucked by only the electromagnetic chuck portion 12. It is noted that, after the workpiece has been centered by the three-jaw chuck portion 14 in the centering step, it is preferable to reduce the backward force which is applied to the projecting portion 136 of the shaft member 118 and which forces the driving member 116 in the backward direction, before the workpiece is chucked by the electromagnetic chuck portion 12, so that the chucking force of the three-jaw chuck portion 14 has been already reduced when the electromagnetic chuck portion 12 is placed into its chucking state. It is further noted that, where the front surface 76 of the mounted chuck 10 faces upwardly, the chucking of the workplace by the three-jaw chuck portion 14 may be released before the workpiece is chucked by the electromagnetic chuck portion 12.

Although it is preferable that the control device 184 is configured to automatically control activations of the three-jaw chuck portion 14 and the electromagnetic chuck portion 12, in response to operation of a single operating member performed by an operator, this is not essential. For example, the control device 184 may be configured to cause the three-jaw chuck portion 14 and the electromagnetic chuck portion 12 to be activated sequentially, in response to sequential operations of a plurality of operating members performed by the operator. In the present embodiment, it is possible to interpret that the control device 184 includes: (i) a feet controlling portion configured to place a selected one of the three-jaw chuck portion 14 and the electromagnetic chuck portion 12, in a chucking state, (ii) a second controlling portion configured to place the three-jaw chuck portion 14 in the chucking state for thereby centering the object, and then to place the electromagnetic chuck portion 12 in the chucking state while placing the three-jaw chuck portion 14 in an unchucking state, and (iii) a third controlling portion configured to place both of the three-jaw chuck portion 14 and the electromagnetic chuck portion 12 in the chucking state, concurrently with each other.

As described above, in the hybrid chuck 10, where a workplace is to be chucked by the electromagnetic chuck portion 12, the workpiece can be centered by the self-centering function of the three-jaw chuck portion 14, thereby making it possible to eliminate a manually centering operation that has been required to be carried out by an operator in a conventional electromagnetic chuck, and to accordingly reduce a length of time required for chucking the workpiece and improving the production efficiency.

Further, in the three-jaw chuck portion 14 of the hybrid chuck 10, the slide surfaces of the above-described sliders 60, slot-defining members 46 and pressing members 50, the slide surfaces of the above-described T-shaped protrusions 122 and T-slots 120 and the slide surfaces of the above-described central hole 114 and shaft member 118 are surfaces that have been hardened by the heat treatments and accurately ground by the grinding operations, as described above. Therefore, the slide clearance defined between each two of the slide surfaces which are opposed to each other can be made smaller than that in a conventional three-jaw chuck, whereby a higher centering accuracy can be obtained. Further, in the hybrid chuck 10, after the centering of a workpiece, the workpiece can be chucked by the electromagnetic chuck portion 12 with the workpiece being in close contact with the front surface 76 of the chuck main body 20 via the stoppers 30, so that it is possible to avoid problem suffered in a conventional three-jaw chuck, which is separation of the workpiece from the front surface of the chuck. Thus, the workpiece chucked by the hybrid chuck 10 can be machined with an improved accuracy.

The above-described advantages were confirmed in a test conducted to measure the holding-position accuracy of the three-jaw chuck portion 14 of the hybrid chuck 10 constructed according to the above-described embodiment. In this test, an object having a diameter of 680 mm was held by the jaw members attached to the respective sliders 60, wherein each of the jaw members was constituted by the base jaw portion 70 and the top jaw portion 72 that had been machined in accordance with the above-described self-cutting process. Meanwhile, the holding-position accuracy of a commercially available three-jaw chuck as a comparative example was also measured by using the object having the diameter of 680 mm. In this commercially available three-jaw chuck, the guide slots are provided directly in the main body itself made of a cast iron, and the sliders are fitted in the respective guide slots. Results of the measurements are shown in TABLE 1.

TABLE 1

| Measurement Item | Three-Jaw Chuck Portion of the Invention | Comparative Example |
| --- | --- | --- |
| Repeatability of Each Jaw | 0.01 mm | 0.03 mm-0.05 mm |
| Centering Accuracy | 0.01 mm | 0.05 mm-0.1 mm |
| Maximum Separation | 0.01 mm | 0.2 mm or more |

In the above TABLE 1, "Repeatability of Each Jaw" represents a repeatability of positioning of each top jaw portion that was measured by causing the object to be repeatedly chucked and unchucked, "Centering Accuracy" represents an amount of runout of the chucked object that was measured at its outer circumferential surface, and "Maximum Separation" represents an amount by which the object was separated or displaced from the stopper or the front surface of the chuck upon motion of chucking the object by the chuck, wherein the amount corresponds to a distance between an end face of the object and the stopper or the front surface of the chuck (with which the end face had been in close contact before the chucking motion of the chuck) when the chucking motion of the chuck was completed. As is apparent from TABLE 1, the holding-position accuracy of the three-jaw chuck portion 14 of the hybrid chuck 10 is remarkably higher than that of the conventional three-jaw chuck as the comparative example. It is noted that the centering accuracy could considerably vary depending on condition of operator's care or maintenance for the jaw members, generally, by 0.05-0.1 mm.

Further, the hybrid chuck 10 constructed according to the embodiment of the invention is advantageous over a conventional three-jaw chuck with respect to a length of period required for the manufacturing. Specifically, the hybrid chuck 10 requires 1.5 month for the manufacturing, while a conventional three-jaw chuck requires 4-6 months for the manufacturing. Thus, it was confirmed that the period required for the manufacturing the hybrid chuck 10 corresponds to 25.38% of that required for manufacturing the conventional three-jaw chuck.

Moreover, in the hybrid chuck 10, all the portions defining the slide surfaces that influences the holding-position accuracy are constituted by members independent of the chuck main body 20, so that each of all the slide-surface defining portions can be made of a material different from a material of the chuck main body 20, and can be hardened by heat treatment and ground accurately. Therefore, all the slide-surface defining portions can be easily produced with high precision, and can be restrained from being worn by long-term use whereby the high precision can be maintained for a long period of time. Further, when the holding-position accuracy is eventually deteriorated as a result of wear or the like, only the small-sized member or members can be repaired or replaced by a new one or ones, independently of the chuck main body 20, whereby the repair can be easily made with a reduced maintenance cost. These advantages are effective, particularly, where the chuck is a large-sized chuck with the chuck main body having a diameter of more than 500 mm, 700 mm or 1000 mm.

Figure 10:
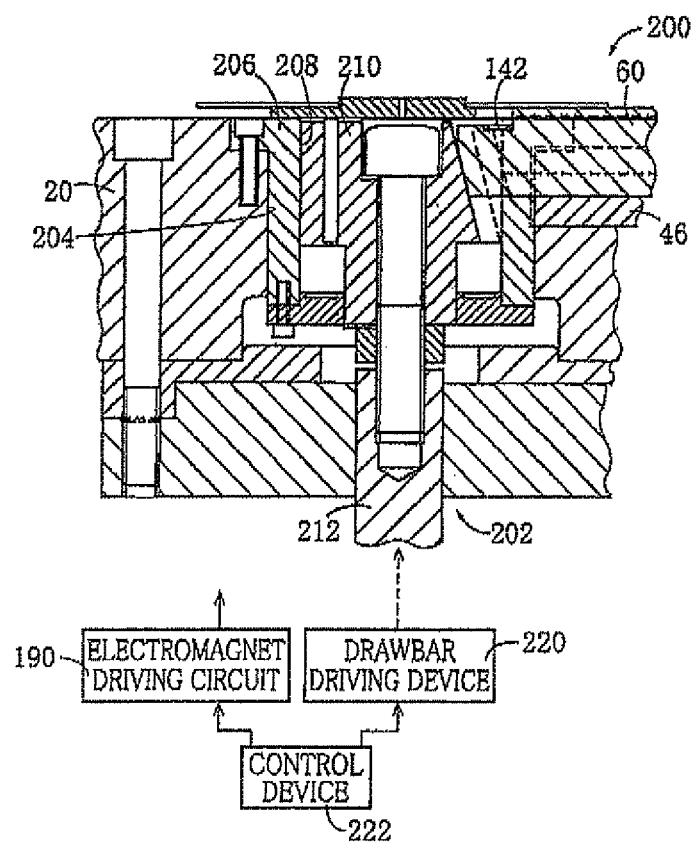
FIG. 10 is an axial cross sectional view showing a three-jaw chuck portion included in a hybrid chuck constructed according to another embodiment of the invention.

FIG. 10 shows a hybrid chuck 200 constructed according to another embodiment of the invention. This hybrid chuck 200 is different from the above-described hybrid chuck 10 in some part of the construction such as a jaw driving device 202 for moving the three jaws 42. In the hybrid chuck 200, a central-guide defining member 206 having a generally tubular shape is fixedly fitted in a through-hole 204 that is provided in a central portion of the chuck main body 20 made of a cast iron, and a driving member 210 is axially slidably fitted in a central hole 208 of the tubular-shaped central-guide defining member 206. Each of the central-guide defining member 206 and the driving member 210 is made of high-carbon steel (e.g., S50C), and an inner circumferential surface of the central-guide defining member 206 and an outer circumferential surface of the driving member 210 are slide surfaces that were ground with high precision. The driving member 210 is connected to a drawbar 212 which is axially movably disposed in an axially extending through-hole of a spindle (not shown) of a machine tool (not shown), so that the driving member 210 is movable by the drawbar 212 in axially opposite directions. The other elements of this hybrid chuck 200 are substantially the same as those of the above-described hybrid chuck 10, and descriptions thereof will not be provided.

The hybrid chuck 200 can be used generally in three manners as described below, with a drawbar driving device 220 and the electromagnet driving circuit 190 being controlled by a control device 222. The drawbar driving device 220 is provided for driving the drawbar, while the electromagnet driving circuit 190 is provided far energizing the electromagnets 26.

A first one of the three manners is that the three-jaw chuck portion 14 is used only for centering a workpiece as in the above-described hybrid chuck 10. A second one of the three manners is that the three-jaw chuck portion 14 is used not only for centering a workpiece but also for chucking the workpiece during machining of the workpiece. That is, in the second manner, during the machining, the workpiece is chucked by a selected one of the electromagnetic chunk portion 12 and the three-jaw chuck portion 14, for thereby taking the advantage of the three-jaw chuck portion 14 that provides a large chucking force and also the advantage of the electromagnetic chuck portion 12 that makes it possible to avoid separation of the workpiece from the chuck 200. For example, a heavy or rough machining is carried out with the workpiece being chucked by the three-jaw chuck portion 14, and then a light or finish machining is carried out with the workpiece being chucked by the electromagnetic chuck portion 12, so that it is possible to take both of the advantages of the three-jaw chuck portion 14 and the electromagnetic chuck portion 12. It is preferable that, in this example, where the workpiece is unchucked after the rough machining and is rechucked before the finish machining, the finish machining is carried out after the workpiece is once centered by the three-jaw chuck portion 14 with application of a drawing force to the drawbar 212, which is smaller than a drawing force applied to the drawbar 212 during the rough machining. A third manner is the same as the second manner in that the three-jaw chuck portion 14 is used also for chucking the workpiece during machining of the workpiece, and is different from the second manner in that the workpiece is chucked by both of the electromagnetic chuck portion 12 and the three-jaw chuck portion 14. This third manner, in which the electromagnetic chuck portion 12 and the three-jaw chuck portion 14 are placed in their chucking states concurrently with each other, is for firmly chucking the workpiece and is effective, particularly, where the workpiece as to be subjected to a heavy machining. In the present embodiment, it is possible to interpret that the control device 222 includes: (i) a first controlling portion configured to place a selected one of the three-jaw chuck portion 14 and the electromagnetic chuck portion 12, in a chucking state, (ii) a second controlling portion configured to place the three-jaw chuck portion 14 in the chucking state for thereby centering the object, and then to place the electromagnetic chuck portion 12 in the chucking state while placing the three-jaw chuck portion 14 in an unchucking state, and (iii) a third controlling portion configured to place both of the three-jaw chuck portion 14 and the electromagnetic chuck portion 12 in the chucking state, concurrently with each other.

The embodiments of the invention have been described in details, however, for illustrative purpose only. It is to be understood that the present invention is not limited to the embodiments, and may be otherwise embodied with various changes and modifications, such as those described in the above-described "VARIOUS MODES OF THE INVENTION", which may occur to those skilled in the art.

What is claimed is:

1. A vertical lathe comprising:
   a spindle;
   a chuck attached to said spindle and rotatable together with said spindle;
   a tool post configured to hold a tool;
   a moving device configured to move said tool post: and
   a control device configured to control said moving device, so as to control movement of the tool held by said tool post relative to an object chucked by said chuck during machining performed by said vertical lathe,
   wherein said chuck includes:
   (i) a main body having a central axis:
   (ii) three jaws each movably held med to said main body;
   (iii) a jaw driving device configured to cause each of said three jaws to be radially moved relative to said main body in synchronization with one another, said jaw driving device including (iii-1) a driving member which is slidably fitted with a central guide provided in a central portion of said main body, and which is movable in opposite directions parallel to an axial direction parallel to said central axis, and (iii-2) a movement converting mechanism provided between said driving member and said three jaws, and configured to convert axial movement of said driving member into radial movement of each of said three jaws,
   (iv) a biasing device biasing said driving member relative to said main body in a forward direction that is one of said opposite directions; and
   (v) a force receiving portion configured to receive, from a front side of a front surface of said main body, a backward force forcing said driving member to be moved, against a biasing force generated by said biasing device, in a backward direction that is the other of said opposite directions, and
   wherein said control device is configured to control said moving device so as to move said tool post relative to said chuck, such that said tool post applies the backward force to said force receiving portion of said chuck, thereby moving said driving member in the backward direction and causing said three jaws to be radially moved relative to said main body.

2. The vertical lathe according to claim 1, wherein said control device is configured to control said moving device, such that one of said tool post and an operating member as the tool held by said tool post is brought into contact with said force receiving portion of said chuck, thereby applying the backward force to said force receiving portion.

3. The vertical lathe according to claim 1, wherein said force receiving portion projects forwardly from said front surface of said main body of said chuck.

4. The vertical lathe according to claim 1, wherein said movement converting mechanism of said jaw driving device of said chuck is configured to convert movement of said driving member in the backward direction into radially inward movement of each of said three jaws.

5. The vertical lathe according to claim 1,
   wherein said chuck includes three slot-defining members each constituted by a member independent of said main body and defining therein a guide slot, each of said three slot-defining members having slot-opening-side end surfaces in which said guide slot opens, said three slot-defining members being detachably attached to said main body such that said guide slot of each of said three slot-defining members extends in a radial direction that is perpendicular to said central axis of said main body,
   wherein each of said three jaws includes:
     a fitted portion which is fitted in said guide slot defined in a corresponding one of said three slot-defining members and which is slidingly movable along said guide slot without contact thereof with said main body; and
     an engaging portion which projects from said fitted portion in said axial direction and which is configured to engage with one of an outer circumferential surface and an inner circumferential surface of the object that is to be chucked by said chuck,
   wherein said chuck includes three pairs of pressing members each pair of which are detachably fixed to said slot-opening-side end surfaces of a corresponding one of said three slot-defining members, and each pair of which engage with engaged surfaces of said fitted portion of a corresponding one of said three jaws, thereby preventing displacement of said fitted portion of said corresponding one of said three jaws in said axial direction, from said guide slot defined in a corresponding one of said three slot-defining members, said engaged surfaces of said fitted portion of each of said three jaws facing a corresponding pair of said three pairs of pressing members, and
   wherein said jaw driving device is configured to cause each of said three jaws to be moved along said guide slot defined in a corresponding one of said three slot-defining members, such that said three jaws are moved in synchronization with one another.

6. The vertical lathe according to claim 5, wherein each of said three slot-defining members, said fitted portion of each of said three jaws and each pair of said three pairs of pressing members are made of respective materials each having a higher degree of wear resistance than a material of said main body.

7. The vertical lathe according to claim 5,
wherein said fitted portion of each of said three jaws has slide surfaces that are to be slid on slide surfaces of a corresponding pair of said three pairs of pressing members and a corresponding one of said three slot-defining members when said each of said three jaws is moved, and
wherein said slide surfaces of said fitted portion of each of said three jaws and said slide surfaces of said corresponding pair of said three pairs of pressing members and said corresponding one of said three slot-defining members are hardened and ground surfaces.

8. The vertical lathe according to claim 5,
wherein said central guide of said chuck is defined by a central-guide defining member which is independent of said main body and which is made of a material having a higher degree of wear resistance than a material of said main body,
wherein said central-guide defining member is detachably fixed to said main body, and has a slide surface that is to be slid on a slide surface of said driving member, and
wherein said slide surface of said central-guide defining member and said slide surface of said driving member are hardened and ground surfaces.

9. The vertical lathe according to claim 5,
wherein said main body has three fitting slots provided in a front surface of said main body, such that said three fitting slots extend radially from said central axis and are equi-angularly spaced apart from one another;
wherein said slot-defining members and said pressing members are fitted in said fitting slots, and are fixed to said main body, and
wherein each of said fitting slots has a given depth by which said slot-defining members and said pressing members are fitted in said fitting slots without said slot-defining members and said pressing members protruding from said front surface of said main body in said axial direction.

10. The vertical lathe according to claim 1, wherein said movement converting mechanism includes mutually contacted portions that are held in slidable contact with each other, said mutually contacted portions being hardened and ground portions.

11. The vertical lathe according to claim 1,
wherein said chuck further includes an electromagnetic chuck portion including at least one electromagnet that is provided integrally in said main body, and
wherein said electromagnetic chuck portion is configured to chuck the object which is made of a magnetic material and which is to be disposed on a front surface of said main body, by sucking the object owing to a magnetic suction force generated by said at least one electromagnet.

12. The vertical lathe according to claim 11,
wherein said three jaws and said jaw driving device cooperate to constitute a three-jaw chuck portion,
wherein said chuck further includes a control device configured to control activations of said three jaw chuck portion and said electromagnetic chuck portion, and
wherein said control device includes at least one of (i) a first controlling portion configured to place a selected one of said three jaw chuck portion and said electromagnetic chuck portion, in a chucking state, (ii) a second controlling portion configured to place said three jaw chuck portion in the chucking state thereby centering the object, and then to place said electromagnetic chuck portion in the chucking state while placing said three jaw chuck portion in an unchucking state, and (iii) a third controlling portion configured to place both of said three jaw chuck portion and said electromagnetic chuck portion in the chucking state, concurrently with each other.

* * * * *